United States Patent
Kobayashi

(10) Patent No.: US 9,824,431 B2
(45) Date of Patent: Nov. 21, 2017

(54) IMAGE SYNTHESIS APPARATUS, IMAGE SYNTHESIS METHOD, AND RECORDING MEDIUM

(71) Applicant: Morpho, Inc., Tokyo (JP)

(72) Inventor: Michihiro Kobayashi, Tokyo (JP)

(73) Assignee: Morpho, Inc., Tokyo (JP)

( * ) Notice: Subject to any disclaimer, the term of this patent is extended or adjusted under 35 U.S.C. 154(b) by 0 days.

(21) Appl. No.: 15/084,602

(22) Filed: Mar. 30, 2016

(65) Prior Publication Data

US 2016/0292838 A1  Oct. 6, 2016

(30) Foreign Application Priority Data

Mar. 31, 2015 (JP) ................................ 2015-071487

(51) Int. Cl.
*G06K 9/40* (2006.01)
*G06T 5/50* (2006.01)
*G06T 11/60* (2006.01)

(52) U.S. Cl.
CPC ............ *G06T 5/50* (2013.01); *G06T 11/60* (2013.01); *G06T 2207/20016* (2013.01); *G06T 2207/20021* (2013.01); *G06T 2207/20048* (2013.01); *G06T 2207/20221* (2013.01)

(58) Field of Classification Search
CPC . G06T 5/50; G06T 11/60; G06T 2207/20221; G06T 2207/20021; G06T 2207/20048; G06T 2207/20016
USPC ....... 382/284, 254, 263, 264, 266, 274, 275, 382/190, 191, 168, 173, 181
See application file for complete search history.

(56) References Cited

U.S. PATENT DOCUMENTS

| | | | | |
|---|---|---|---|---|
| 6,034,785 A * | 3/2000 | Itoh | ........ | G06K 15/00 358/1.18 |
| 6,222,637 B1 * | 4/2001 | Ito | .......... | G06T 11/60 358/1.16 |
| 7,570,286 B2 * | 8/2009 | Koike | ....... | G06T 5/50 348/235 |
| 8,223,225 B2 * | 7/2012 | Jang | ......... | G06T 5/50 348/222.1 |
| 8,736,706 B1 * | 5/2014 | Valente | ..... | H04N 5/232 348/218.1 |
| 8,849,061 B2 * | 9/2014 | Inoue | ....... | H04N 5/21 382/254 |
| 9,349,351 B2 * | 5/2016 | Mizuno | ...... | G09G 5/377 |
| 2004/0165788 A1 | 8/2004 | Perez et al. | | |

* cited by examiner

*Primary Examiner* — Sheela C Chawan

(74) *Attorney, Agent, or Firm* — Sughrue Mion, PLLC

(57) ABSTRACT

An image synthesis apparatus for generating a composite image by synthesizing a second image with a first image, includes an image acquisition unit configured to acquire first group images including the first image and a plurality of different resolution images corresponding to the first image, and second group images including the second image and a plurality of different resolution images corresponding to the second image, a frequency component calculation unit configured to calculate low-frequency components and high-frequency components from the first group images and the second group images, and an image synthesis unit configured to generate the composite image on the basis of the low-frequency components of the first group images and the high-frequency components of the second group images.

18 Claims, 10 Drawing Sheets

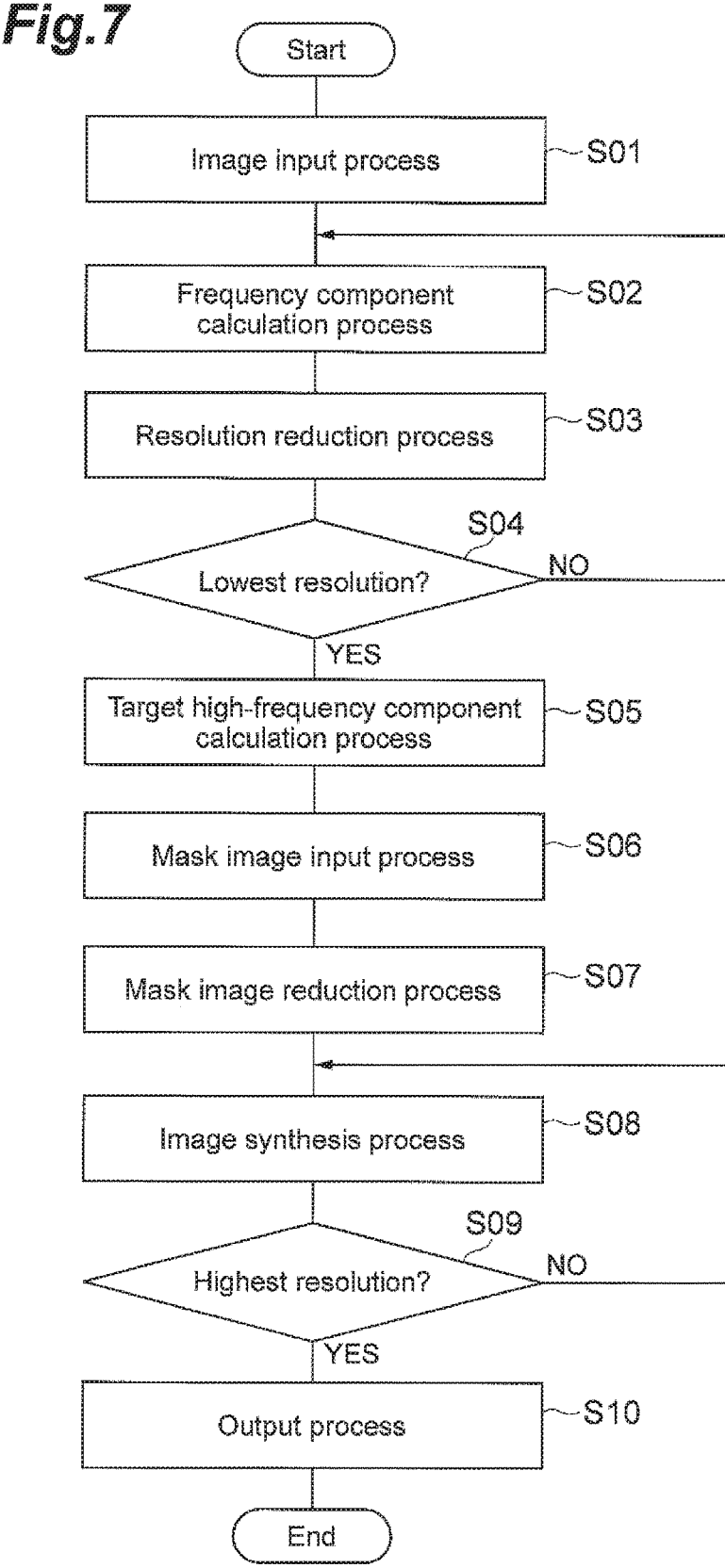

IMAGE SYNTHESIS APPARATUS, IMAGE SYNTHESIS METHOD, AND RECORDING MEDIUM

CROSS-REFERENCE TO RELATED APPLICATION

This application is based on Japanese Patent Application No. 2015-071487 filed with Japan Patent Office on Mar. 31, 2015, the entire contents of which are hereby incorporated by reference.

BACKGROUND

Field of Invention

The present invention relates to an image synthesis apparatus, an image synthesis method, an image synthesis program, and a recording medium.

Background Arts

Conventionally, Poisson blending is known as image synthesis technology (for example, see Patent Literature 1: U.S. Patent Application Publication No. 200410165788). This Poisson blending is a technique for performing synthesis so that a gradient error between two images to be synthesized is minimized. In Poisson blending, a boundary between two images which are to be synthesized is less noticeable than in alpha blending, a generally used blending technology.

SUMMARY OF INVENTION

However, a gradient of an image which Poisson blending optimizes is a vector field having a component of an x-direction and a component of a y-direction, and a general vector field may not have a correct property as a gradient (integrability is low). Poisson blending is a technique for obtaining a gradient close to an objective gradient while maintaining integrability. Accordingly, when integrability of the objective gradient is low, a result significantly deviating from an objective value is likely to be caused by optimization of the pixel values. This deviation (called "pixel value distortion") causes generation of an unintended color and may be perceived as an artifact.

An image synthesis apparatus, an image synthesis method, an image synthesis program, and a recording medium storing the image synthesis program capable of suppressing the pixel value distortion due to mathematical constraints, making a boundary between two images which are to be synthesized unnoticeable, and generating a composite image without discordance are desired.

An image synthesis apparatus according to an aspect of the present invention is an image synthesis apparatus for generating a composite image by synthesizing a second image with a first image. The image synthesis apparatus includes: an image acquisition unit configured to acquire first group images including the first image and a plurality of different resolution images corresponding to the first image, and second group images including the second image and a plurality of different resolution images corresponding to the second image; a frequency component calculation unit configured to calculate low-frequency components and high-frequency components from the first group images and the second group images; and an image synthesis unit configured to generate the composite image on the basis of the low-frequency components of the first group images and the high-frequency components of the second group images.

According to this image synthesis apparatus, the composite image is generated on the basis of the low-frequency components of the first group images and the high-frequency components of the second images. Information of the luminance and hue as a whole is included in the low-frequency component, while information of the texture is included in the high-frequency component. Thus, while the luminance and hue of the composite image are adjusted in accordance with the luminance and hue of the background image, it is possible to reflect the texture (detailed pattern) of the foreground image on the composite image. Also, because the composite image is generated by synthesizing various frequency components, the pixel value distortion due to mathematical constraints as seen in Poisson blending does not theoretically occur. As a result, it is possible to generate a composite image without a noticeable boundary between the two images while the pixel value distortion due to mathematical constraints is suppressed.

The image acquisition unit may shrink the low-frequency component of one of the first group images having a first resolution and the low-frequency component of one of the second group images having the first resolution, thereby generating one of the first group images having a second resolution less than the first resolution and one of the second group images having the second resolution. In this case, it is possible to facilitate resolution reduction of the first image and the second image.

The image synthesis unit may generate a temporary composite image for each resolution, and after enlarging the generated temporary composite image having the second resolution and replacing a non-synthesis target region which is not a region of a synthesis target of the enlarged temporary composite image having the second resolution with a region corresponding to the non-synthesis target region in the first image having the first resolution, the image synthesis unit may generate the temporary composite image having the first resolution by synthesizing a target high-frequency component in the synthesis target region so that a difference between a high-frequency component of the synthesis target region which is the region of the synthesis target of the enlarged temporary composite image having the second resolution and the target high-frequency component determined on the basis of a high-frequency component of the one of the second group images having the first resolution is minimized. According to this configuration, one of the first group images having the first resolution is represented with no change in a non-synthesis target region in the temporary composite image having the first resolution because a non-synthesis target region of the enlarged temporary composite image having the second resolution is replaced with a region corresponding to the non-synthesis target region in the one of the first group images having the first resolution. Then, after the one of the first group images having the first resolution is represented in the non-synthesis target region, the target high-frequency component of the first resolution is synthesized in the synthesis target region so that a difference between the high-frequency component of the synthesis target region and the target high-frequency component is minimized. Thus, a change at the boundary between the synthesis target region and the non-synthesis target region is reduced, and texture of the one of the second group images having the first resolution is reproduced in the synthesis target region. In the temporary composite image having the first resolution with no change in the luminance and hue as a whole. As a result, a boundary between the two images can be unnoticeable and a composite image can be generated with less discordance. Further, it is possible to shorten a calculation time because the high-frequency component is synthesized in order from the one of the second group images having a low resolution.

The image synthesis unit may set one of the first group images having the lowest resolution among the first group images as the temporary composite image having the lowest resolution. Information of the luminance and hue of the first image as a whole is included in the lowest-frequency component of the first image. Thus, it is possible to conform the luminance and hue as a whole to those of the first image by setting the lowest-frequency component of the first image as the temporary composite image having the lowest resolution.

The image synthesis apparatus according to another aspect of the present invention may further include a mask image acquisition unit configured to acquire mask group images corresponding to the plurality of resolutions of the first group images, for defining the synthesis target region and the non-synthesis target region. The image synthesis unit may use each of the mask group images for each resolution to generate the temporary composite image for each resolution. In this case, it is possible to define a synthesis target region and a non-synthesis target region of each resolution by decreasing the resolution of the mask image. Thus, it is possible to easily define the synthesis target region and the non-synthesis target region at each resolution.

The mask image acquisition unit may divide one of the mask group images having the first resolution into blocks each having a predetermined number of pixels and generate one of the mask group images having the second resolution by replacing a block including the synthesis target region with a pixel of the synthesis target region and replacing a block not including the synthesis target region with a pixel of the non-synthesis target region. In this case, it is possible to further enlarge a region occupied by the synthesis target pixel in the mask image as the resolution of the mask image becomes lower. Thus, in a synthesis target region at a certain resolution in the image synthesis, the target high-frequency component having a resolution less than the certain resolution is synthesized. Even in the periphery of the boundary between the synthesis target region and the non-synthesis target region, the target high-frequency component having a resolution less than the certain resolution is synthesized. Accordingly, it is possible to improve the reproducibility of the second image, make the boundary between the two images unnoticeable, and generate the composite image with less discordance.

For each resolution, the high-frequency component calculation unit may calculate the high-frequency component of the first group images by subtracting the low-frequency component of the first group images from the first group images and calculate the high-frequency component of the second group images by subtracting the low-frequency component of the second group images from the second group images. In this case, the high-frequency components of the first group images at each resolution and the high-frequency components of the second group images at each resolution can be derived with a simple calculation.

An image synthesis method according to still another embodiment of the present invention is an image synthesis method to be performed by an image synthesis apparatus for generating a composite image by synthesizing a second image with a first image. The image synthesis method includes: an image acquisition step of acquiring first group images including the first image and a plurality of different resolution images corresponding to the first image, and second group images including the second image and a plurality of different resolution images corresponding to the second image; a frequency component calculation step of calculating low-frequency components and high-frequency components from the first group images and the second group images; and an image synthesis step of generating the composite image on the basis of the low-frequency components of the first group images and the high-frequency components of the second group images.

According to this image synthesis method, it is possible to have similar effects to the image synthesis apparatus according to the above-described aspect of the present invention.

An image synthesis program according to still another embodiment of the present invention is an image synthesis program for operating a computer to generate a, composite image by synthesizing a second image with a first image. The image synthesis program causes the computer to function as: an image acquisition unit configured to acquire first group images including the first image and a plurality of different resolution images corresponding to the first image, and second group images including the second image and a plurality of different resolution images corresponding to the second image; a frequency component calculation unit configured to calculate low-frequency components and high-frequency components from the first group images and the second group images; and an image synthesis unit configured to generate the composite image on the basis of the low-frequency components of the first group images and the high-frequency components of the second group images.

According to this image synthesis program, it is possible to have similar effects to the image synthesis apparatus according to the above-described aspect of the present invention.

A non-transitory recording medium according to still another embodiment of the present invention is a recording medium recording an image synthesis program for operating a computer to generate a composite image by synthesizing a second image with a first image. The image synthesis program recorded on the recording medium causes the computer to function as: an image acquisition unit configured to acquire first group images including the first image and a plurality of different resolution images corresponding to the first image, and second group images including the second image and a plurality of different resolution images corresponding to the second image; a frequency component calculation unit configured to calculate low-frequency components and high-frequency components from the first group images and the second group images; and an image synthesis unit configured to generate the composite image on the basis of the low-frequency components of the first group images and the high-frequency components of the second group images.

According to this recording medium, it is possible to have similar effects to the image synthesis apparatus according to the above-described aspect of the present invention.

According to the present invention, it is possible to generate a composite image without a noticeable boundary between two images which are to be synthesized while the pixel value distortion due to mathematical constraints is suppressed.

BRIEF DESCRIPTION OF THE DRAWINGS

FIG. 7 is a flowchart illustrating a series of processes of an image synthesis method to be performed by the image synthesis apparatus of FIG. 1.

DESCRIPTION OF EMBODIMENTS

Hereinafter, embodiments of the present invention will be described in detail with reference to the accompanying drawings. The same or equivalent elements in the description of the drawings are assigned with the same reference signs and redundant description thereof will be omitted.

An image synthesis apparatus according to the present embodiment is an apparatus for generating a composite image by synthesizing a foreground image (second image) with a background image (first image). Here, the foreground image and the background image are images serving as targets of image synthesis, where the foreground image is an image of a synthesis source, and the background image is an image of a synthesis destination. The composite image is an image obtained by synthesizing the foreground image to a predetermined region of the background image, and, for example, may have the same size as the background image. The image synthesis apparatus according to the present embodiment is preferably mounted on, for example, a mobile terminal having limited resources such as a portable phone, a digital camera, or a personal digital assistant (PDA). However, the image synthesis apparatus is not limited thereto and may be mounted on, for example, a general computer system. Also, the image synthesis apparatus includes the so-called on-chip image signal processor (ISP) or the like embedded in an imaging apparatus. Hereinafter, the image synthesis apparatus mounted on the portable terminal will be described as an example for ease of understanding.

Figure 1:
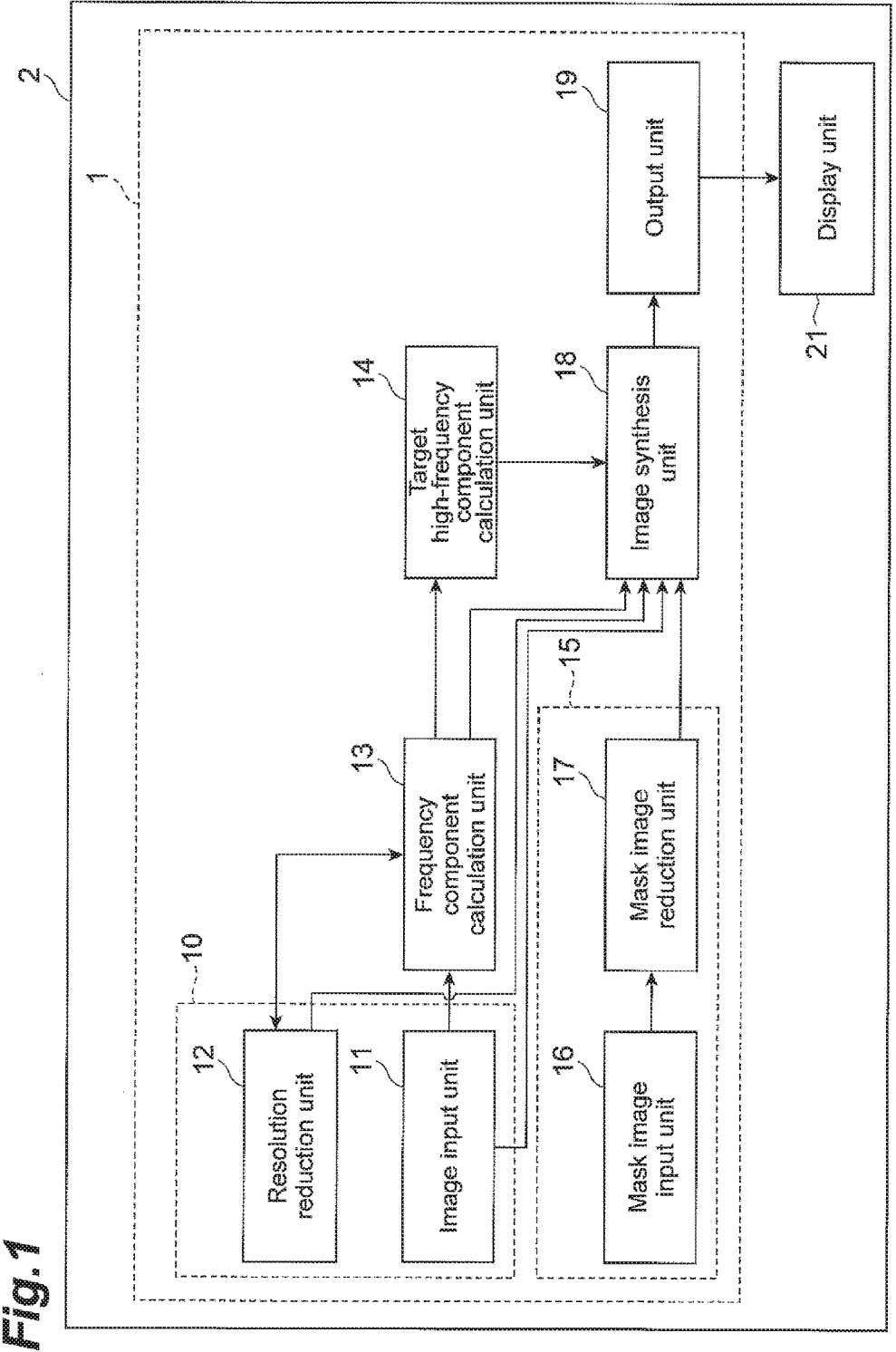
FIG. 1 is a functional block diagram of a portable terminal including an image synthesis apparatus according to the present embodiment.
Figure 2:
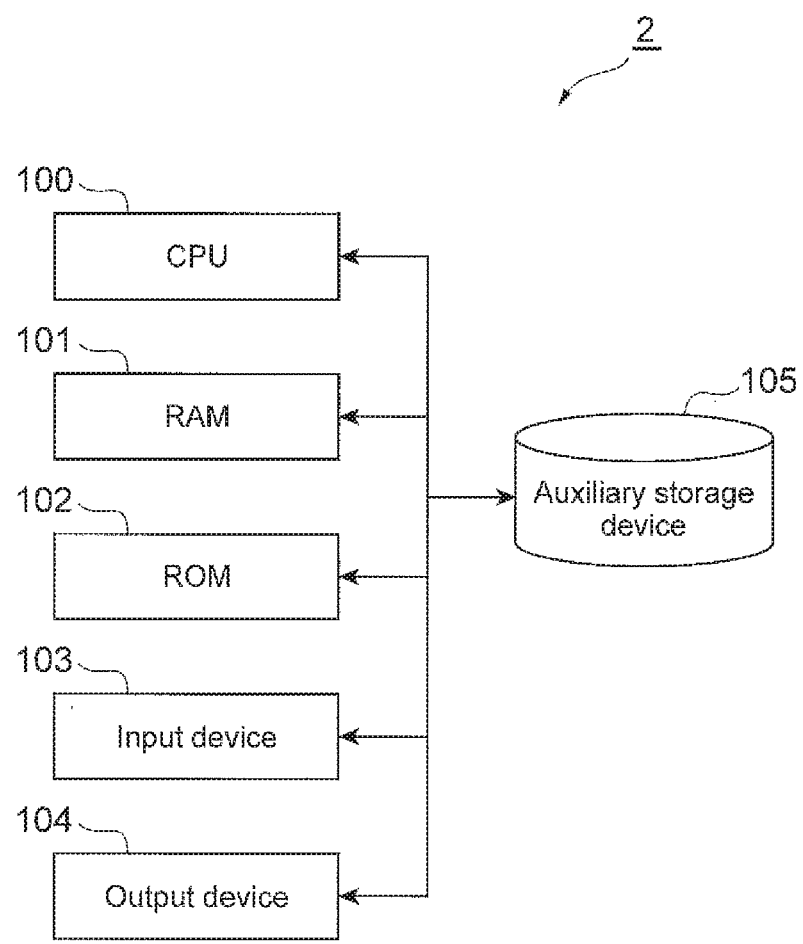
FIG. 2 is a hardware configuration diagram of the portable terminal on which the image synthesis apparatus of FIG. 1 is mounted.

FIG. 1 is a functional block diagram of a portable terminal including an image synthesis apparatus 1 according to the present embodiment. The portable terminal 2 illustrated in FIG. 1 is, for example, a mobile terminal which is carried by a user and has a hardware configuration illustrated in FIG. 2. FIG. 2 is a hardware configuration diagram of the portable terminal 2. As illustrated in FIG. 2, the portable terminal 2 is configured as a general computer system physically including a central processing unit (CPU) 100, main storage devices such as a random access memory (RAM) 101 and a read only memory (ROM) 102, an input device 103 such as a camera or a keyboard, an output device 104 such as a display, an auxiliary storage device 105 such as a hard disk or a semiconductor memory, etc. Functions of the portable terminal 2 and the image synthesis apparatus 1 to be described below are implemented by loading predetermined computer software onto hardware such as the CPU 100 and the RAM 101, operating the input device 103 and the output device 104 under control of the CPU 100, and reading data from and writing data to the main storage apparatus or the auxiliary storage apparatus 105. Also, although the hardware configuration of the portable terminal 2 has been described as above, the image synthesis apparatus 1 may be configured as a general computer system including the CPU 100, the main storage devices such as the RAM 101 and the ROM 102, the input device 103, the output device 104, and the auxiliary storage device 105. Also, the portable terminal 2 may include a communication module, etc.

As illustrated in FIG. 1, the portable terminal 2 includes the image synthesis apparatus 1 and a display unit 21. The image synthesis apparatus 1 functionally includes an image acquisition unit 10, a frequency component calculation unit 13, a target high-frequency component calculation unit 14, a mask image acquisition unit 15, image synthesis unit 18, and an output unit 19.

The image acquisition unit 10 acquires foreground images corresponding to a plurality of resolutions and background images corresponding to the plurality of resolutions. The image acquisition unit 10 shrinks an image of a low-frequency component of a foreground image having a predetermined resolution (first resolution) and an image of a low-frequency component of a background image having the predetermined resolution, thereby generating a foreground image and a background image having a resolution (second resolution) which is one level lower than the predetermined resolution. Specifically, the image acquisition unit 10 includes an image input unit 11 and a resolution reduction unit 12.

The image input unit 11 has a function of inputting a foreground image and a background image to be synthesized. The image input unit 11 may input an image captured by an imaging apparatus, for example, such as a camera, as the foreground image or the background image, or may input an image transmitted from another device via a network or the like as the foreground image or the background image. The image input unit 11 inputs synthesis information for synthesizing the foreground image with the background image. For example, a user of the portable terminal 2 designates a size and a direction of the foreground image to be synthesized and a synthesis position of the foreground image on the background image by performing processes such as horizontal movement, enlargement/reduction, and rotation on the foreground image using the input device 103 such as a touch panel. The image input unit 11 inputs, for example, synthesis information indicating the size of the foreground image, the direction, of the foreground image, the synthesis position, etc. designated by the user of the portable terminal 2 using the input device 103. The image input unit 11 outputs the input foreground image, the input background image, and the input synthesis information to the frequency component calculation unit 13, and outputs the input background image and the synthesis information to the image synthesis unit 18.

The resolution reduction unit 12 has a function of shrinking a low-frequency component of the foreground image having a predetermined resolution and a low-frequency component of the background image having the predetermined resolution calculated by the frequency component calculation unit 13, thereby generating a foreground image and a background image having a resolution which is one level lower than the predetermined resolution. For example, the resolution reduction unit 12 sub-samples the low-frequency component of the foreground image having the predetermined resolution, thereby generating the foreground image having the low resolution which is the half of the predetermined resolution, and the resolution reduction unit 12 sub-samples the low-frequency component of the background image having the predetermined resolution, thereby generating the background image having the low resolution which is the half of the predetermined resolution. Here, an original image for each image is referred to as an image of layer 0 and an image having a resolution of $(1/2)^k$ for the original image is referred to as an image of layer k. That is, as the layer increases, the resolution decreases. Here, k is an integer value of 0 to N. N may be determined to be the count of performing the resolution reduction process, for example, the count of iterating the resolution reduction process to vertically and horizontally shrink the input foreground image and background image to ½, until the size of a shrunk image becomes less than a predetermined value. The resolution reduction unit 12 outputs generated foreground images and background images of layers 1 to N, to the frequency component calculation unit 13, and outputs the background images of layers 1 to N, to the image synthesis unit 18. Also, the "resolution" may be sometimes referred to as a "layer" corresponding to the resolution.

The frequency component calculation unit 13 has a function of calculating low-frequency components and high-frequency components from foreground images corresponding to a plurality of resolutions and background images corresponding to a plurality of resolutions. The frequency component calculation unit 13 calculates a low-frequency component and a high-frequency component for each of the foreground image and the background image input by the image input unit 11 and the foreground image and the background image having lower resolution generated by the resolution reduction unit 12. That is, the frequency component calculation unit 13 calculates the low-frequency component and the high-frequency component for each of foreground images and background images of layers 0 to N−1. The calculation of the low-frequency component and the high-frequency component is performed using a coordinate system of the background image, and the calculation of the low-frequency component and the high-frequency component of the foreground image is performed on the basis of synthesis information output from the image input unit 11. The frequency component calculation unit 13 outputs low-frequency components of the foreground images and the background images of layers 0 to N−1 to the resolution reduction unit 12 and outputs high-frequency components of the foreground images and the background images of layers 0 to N−1 to the target high-frequency component calculation unit 14.

Figure 3:
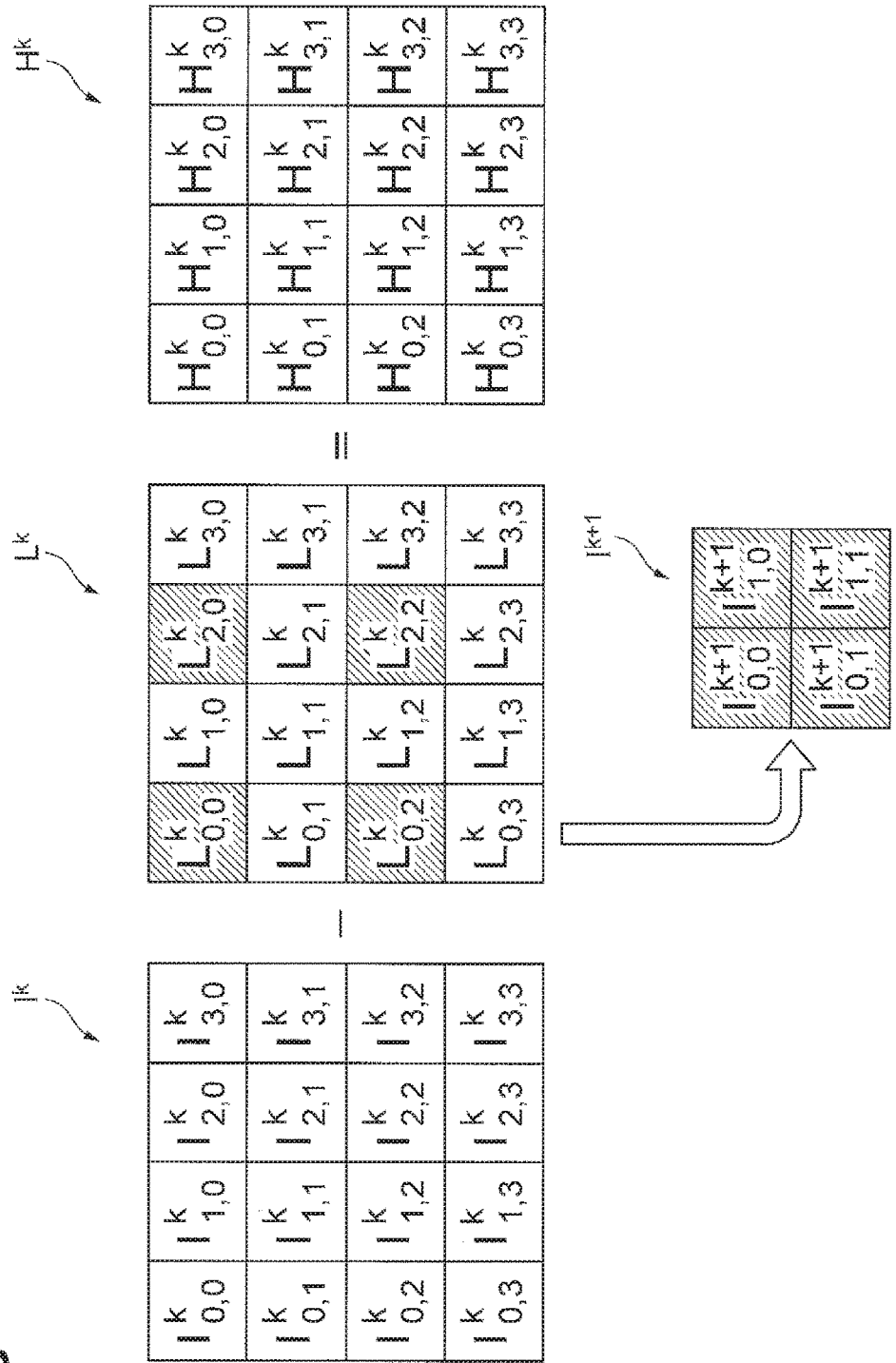
FIG. 3 is a diagram for describing a high-frequency component calculation process and a resolution reduction process.

Processes of the resolution reduction unit 12 and the frequency component calculation unit 13 will be specifically described using FIG. 3. FIG. 3 is a diagram for describing a frequency component calculation process and a resolution reduction process. For example, for each of pixel values $I^k_{i,j}$ of all pixels included in a target image $I^k$ of layer k which is an image serving as a calculation target of a frequency component, the frequency component calculation unit 13 calculates a low-frequency component $L^k_{i,j}$ and a high-frequency component $H^k_{i,j}$ of the pixel. Also, in the following description, a number i attached to a reference sign indicating an image or the like denotes a column number of a pixel of the image or the like, and a number j attached to a reference sign indicating an image or the like denotes a row number of a pixel of the image or the like. In the example of FIG. 3, i denotes an integer value of 0 to 3 and j denotes an integer value of 0 to 3.

Specifically, the frequency component calculation unit 13 first calculates the low-frequency component $L^k_{i,j}$ of the target pixel which is a pixel serving as a calculation target of a frequency component. For example, a low pass filter is used in the calculation of the low-frequency component, and the low-frequency component of the target pixel is calculated by calculating an average of pixel values of 3×3 pixels including a target pixel and the surrounding 8 pixels. The frequency component calculation unit 13 calculates a high-frequency component $H^k_{i,j}$ of the target pixel by subtracting the low-frequency component $L^k_{i,j}$ of the target pixel from the pixel value $I^k_{i,j}$ of the target pixel. The resolution reduction unit 12 generates an image $I^{k+1}$ of layer k+1 by sub-sampling a low-frequency component $L^k$ of the target image $I^k$ of layer k. The resolution reduction unit 12 and the frequency component calculation unit 13 perform the above-described process on the foreground images and the background images of layers 0 to N−1. That is, for each resolution, the frequency component calculation unit 13 calculates the high-frequency component of the foreground image having the resolution by subtracting the low-frequency component of the foreground image having the resolution from the foreground image having the resolution, and calculates the high-frequency component of the background image having the resolution by subtracting the low-frequency component of the background image having the resolution from the background image having the resolution.

The target high-frequency component calculation unit 14 has a function of calculating a target high-frequency component on the basis of a high-frequency component of a foreground image calculated by the frequency component calculation unit 13. The target high-frequency component calculation unit 14 calculates the target high-frequency component on the basis of a high-frequency component of the foreground image in each layer. The target high-frequency component calculation unit 14 calculates the target high-frequency component, for example, by synthesizing the high-frequency component of the foreground image with the high-frequency component of the background image. A method for calculating the target high-frequency component may be appropriately selected, and the composite image may differ according to the selected calculation method. For example, as shown in Equation (1), the target high-frequency component calculation unit 14 may calculate a high-frequency component $H_{fg\_i,j}^k$ of the foreground image of layer k as a target high-frequency component $H_{dst\_i,j}^k$ of layer k for each pixel.

$$H_{dst\_i,j}^k = H_{fg\_i,j}^k \qquad (1)$$

For example, as shown Equation (2), the target high-frequency component calculation unit 14 may calculate a high-frequency component having a larger absolute value between the high-frequency component $H_{fg\_i,j}^k$ of the foreground image of layer k and the high-frequency component $H_{bg\_i,j}^k$ of the background image of layer k as the target high-frequency component $H_{dst\_i,j}^k$ of layer k for each pixel.

$$H_{dst\_i,j}^k = \begin{cases} H_{fg\_i,j}^k & \text{if } |H_{fg\_i,j}^k| > |H_{bg\_i,j}^k| \\ H_{bg\_i,j}^k & \text{otherwise} \end{cases} \qquad (2)$$

For example, as shown in Equation (3), the target high-frequency component calculation unit 14 may calculate the target high-frequency component $H_{dst\_i,j}^{k}$ of layer k by performing alpha-blending on the high-frequency component $H_{fg\_i,j}^{k}$ of the foreground image of layer k and the high-frequency component $H_{bg\_i,j}^{k}$ of the background image of layer k for each pixel. Also, α is a value of 0 to 1. The target high-frequency component calculation unit 14 outputs calculated target high-frequency components of layers 0 to N−1 to the image synthesis unit 18.

$$H_{dst\_i,j}^{k} = \alpha \times H_{fg\_i,j}^{k} + (1-\alpha) \times H_{bg\_i,j}^{k} \quad (3)$$

The mask image acquisition unit 15 acquires mask images corresponding to the plurality of resolutions. The mask image is an image in which a synthesis target region that is a region of a synthesis target and a non-synthesis target region which is not a region of a synthesis target are defined. The mask image defines the synthesis target region by a synthesis target pixel that is a pixel of a synthesis target and defines the non-synthesis target region by a non-synthesis target pixel which is a pixel that is not the synthesis target. The mask image is a binary image. For example, in the mask image, a pixel having a pixel value of 1 is a synthesis target pixel and a pixel having a pixel value of 0 is a non-synthesis target pixel. For example, the mask image has the same size as the foreground image. The mask image acquisition unit 15 divides a mask image having a predetermined resolution into blocks each having a predetermined number of pixels, replaces a block including the synthesis target region with a pixel of the synthesis target region, and replaces a block not including the synthesis target region with a pixel of the non-synthesis target region, thereby generating the mask image having a resolution which is one level lower than the resolution of the divided mask image. Specifically, the mask image acquisition unit 15 includes a mask image input unit 16 and a mask image reduction unit 17.

The mask image input unit 16 has a function of inputting the mask image. For example, the mask image input unit 16 inputs the mask image designated using the input device 103 such as a touch panel by the user of the portable terminal 2 or inputs the mask image automatically generated by an application. The mask image input unit 16 outputs the input mask image to the mask image reduction unit 17.

The mask image reduction unit 17 has a function of reducing the mask image input by the mask image input unit 16. For example, the mask image reduction unit 17 divides the mask image into blocks each having 2×2 pixels, replaces a block with one synthesis target pixel when any pixel included in the block is the synthesis target pixel, and replaces a block with one non-synthesis target pixel when all pixels included in the block are non-synthesis target pixels. That is, the mask image reduction unit 17 reduces the mask image to a mask image having a resolution of ½ by performing an OR operation (logical addition) on synthesis target pixels included in a block of 2×2 pixels.

When the pixel value of the synthesis target pixel is 1 and the pixel value of the non-synthesis target pixel is 0, the mask image reduction unit 17 reduces the mask image to a mask image having a resolution of ½ by performing an OR operation on pixel values included in the block of 2×2 pixels. Also, similar to the foreground image and the background image, an original image for the mask image is referred to as a mask image of layer 0 and a mask image having a resolution of $(1/2)^k$ for the original image is referred to as a mask image of layer k. With the reduction of the mask image, a region occupied by the synthesis target pixel in the mask image, that is, the synthesis target region, is enlarged.

The mask image reduction unit 17 generates mask images of layers 1 to N−1 and outputs the mask images of layers 0 to N−1 to the image synthesis unit 18.

Figure 4:
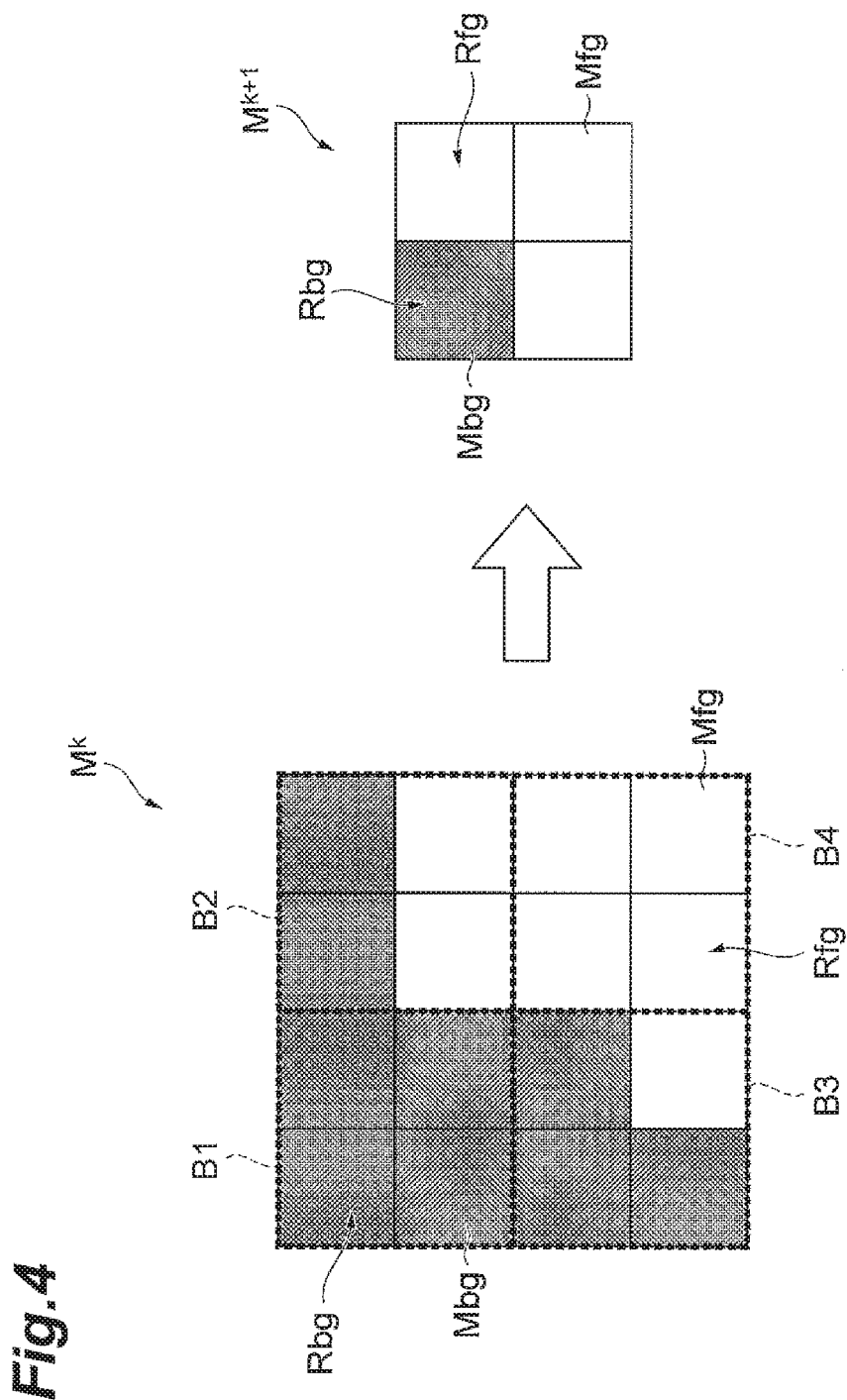
FIG. 4 is a diagram for describing a mask image reduction process.

A process of the mask image reduction unit 17 will be specifically described using FIG. 4. FIG. 4 is a diagram for describing a mask image reduction process. For example, the mask image reduction unit 17 divides a mask image $M^k$ of layer k into blocks (block B1, block B2, block B3, and block B4) each having 2×2 pixels. In block B1, all pixels are non-synthesis target pixels Mbg. Thus, because a non-synthesis target region Rbg is included in block B1 and a synthesis target region Rfg is not included in block B1, a pixel corresponding to block B1 is set to the non-synthesis target pixel Mbg in a mask image M layer k+1. In block B2, two pixels are synthesis target pixels Mfg and two pixels are non-synthesis target pixels Mbg. Thus, because the synthesis target region Rfg and the non-synthesis target region Rbg are included in block B2, a pixel corresponding to block B2 is set to the synthesis target pixel Mfg in the mask image $M^{k+1}$ of layer k+1. In block B3, one pixel is the synthesis target pixel Mfg and three pixels are the non-synthesis target pixels Mbg. Thus, because the synthesis target region Rfg and the non-synthesis target region Rbg are included in block B3, a pixel corresponding to block B3 is set to the synthesis target pixel Mfg in the mask image $M^{k+1}$ of layer k+1. In block B4, all pixels are the synthesis target pixels Mfg. Thus, because the synthesis target region Rfg is included in block B4, a pixel corresponding to block B4 is set to the synthesis target pixel Mfg in the mask image $M^{k+1}$ of layer k+1. Thus, the mask image reduction unit 17 generates the mask image $M^{k-1}$ from the mask image $M^k$.

The image synthesis unit 18 has a function of generating a composite image on the basis of low-frequency components of background images corresponding to a plurality of resolutions and high-frequency components of foreground images corresponding to a plurality of resolutions. The image synthesis unit 18 generates a composite image for each resolution using a resolution-specific mask image. To conform the luminance and hue as a whole to those of the background image, the image synthesis unit 18 designates the background image of layer N having the lowest resolution among the background images corresponding to the plurality of resolutions as the composite image of layer N without change. The image synthesis unit generates the composite image of layer k by performing preprocessing and an optimization process on a composite image of layer k+1. Also, the process of the image synthesis unit 18 is performed using a coordinate system of the background image.

First, the pre-processing of the image synthesis unit 18 will be described. In the pre-processing, the image synthesis unit 18 enlarges a generated composite image having a predetermined resolution and generates the enlarged composite image. The image synthesis unit 18 replaces the non-synthesis target region of the enlarged composite image having the resolution with a region corresponding to a non-synthesis target region in the background image having a resolution which is one level higher than the predetermined resolution. Hereinafter, the preprocessing will be described in detail. The image synthesis unit 18 enlarges the composite image of layer k+1, to be doubled and generates the enlarged composite image. For example, this enlargement process is performed with a nearest neighbor algorithm. The image synthesis unit 18 applies the mask image of layer k to a predetermined position of the enlarged composite image. The position to which the mask image is applied is a position corresponding to a synthesis position indicated by synthesis information output from the image input unit 11 in the enlarged composite image. The image synthesis unit 18 replaces a pixel value of a pixel corresponding to the non-synthesis target pixel of the mask image with a pixel value of a pixel of a background image of layer k in the enlarged composite image. At this time, the image synthesis unit 18 replaces the pixel value of the pixel corresponding to a pixel outside of a range of the mask image in the enlarged composite image with a pixel value of a pixel of the background image of layer k corresponding to the pixel. Thereby, the image synthesis unit 18 generates a pre-synthesis image of layer k.

Figure 5:
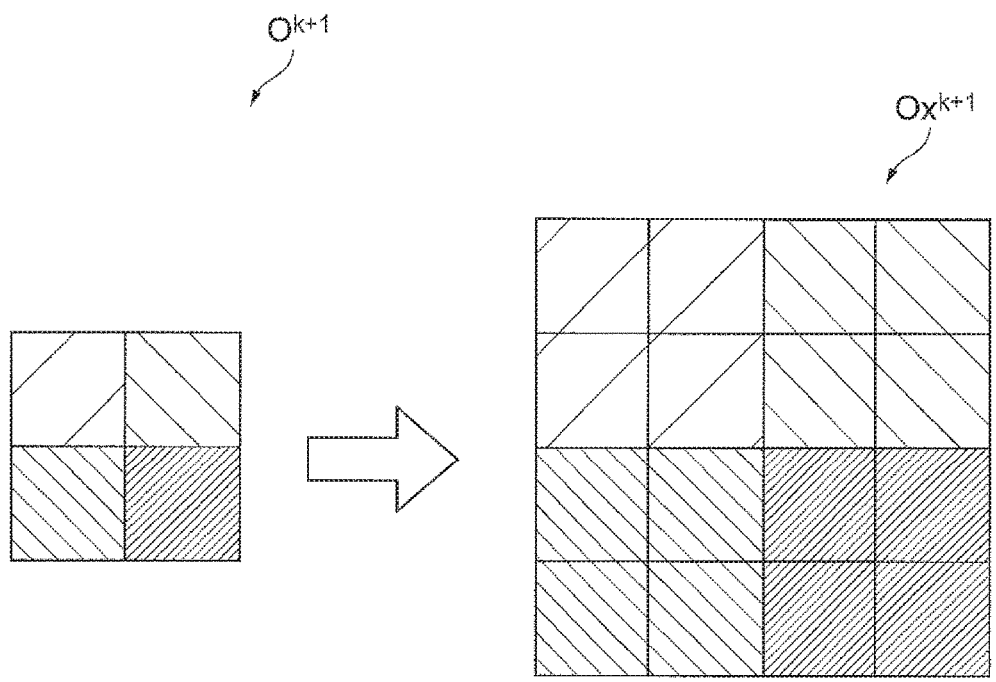
FIG. 5 is a diagram for describing pre-processing.
Figure 6A:
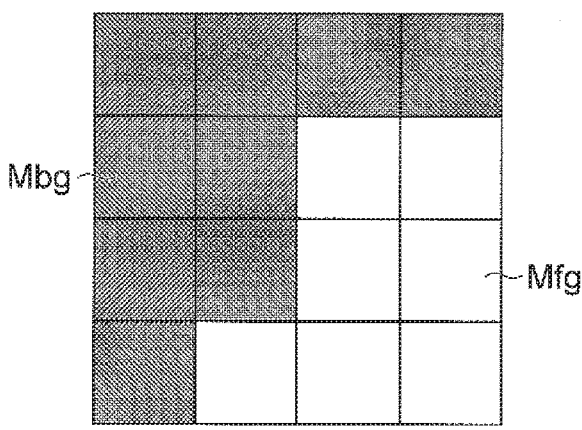
FIGS. 6A to 6C are diagrams for describing pre-processing.
Figure 6B:
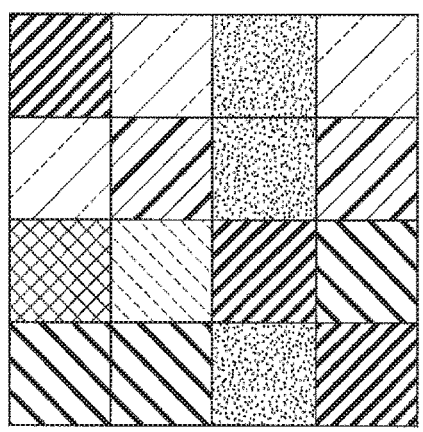
Figure 6C:
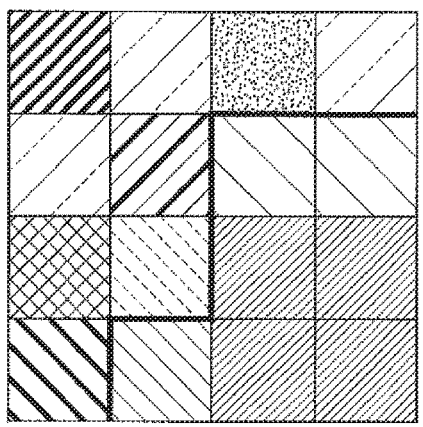

Pre-processing of the image synthesis unit 18 will be specifically described using FIGS. 5 and 6A to 6C. FIGS. 5 and 6A to 6C are diagrams for describing pre-processing. As illustrated in FIG. 5, the image synthesis unit 18 generates an enlarged composite image $Ox^{k+1}$ obtained by doubling the composite image $O^{k+1}$ of layer k+1. For example, for each pixel of the composite image $O^{k+1}$, the image synthesis unit 18 generates the enlarged composite image $Ox^{k+1}$ by performing enlargement to 2×2 pixels having the same pixel value as the pixel. The image synthesis unit 18 applies the mask image $M^k$ of layer k illustrated in FIG. 6A to the enlarged composite image $Ox^{k+1}$, and replaces a pixel value of the pixel corresponding to the non-synthesis target pixel Mbg of the mask image $M^k$ with a pixel value of a pixel of a background image $I_{bg}^k$ of layer k illustrated in FIG. 6B. Thus, a pre-synthesis image $Op^k$ illustrated in FIG. 6C is generated.

Next, an optimization process of the image synthesis unit 18 will be described. In the optimization process, the image synthesis unit 18 generates a composite image having a resolution which is one level higher than a predetermined resolution by synthesizing a target high-frequency component in the synthesis target region so that a difference between the high-frequency component of a synthesis target region of an enlarged composite image having the predetermined resolution and the target high-frequency component having the resolution which is one level higher than the predetermined resolution is minimized. Hereinafter, the optimization process will be described in detail. The image synthesis unit 18 performs the optimization process on a pixel corresponding to the synthesis target pixel in the pre-synthesis image using the target high-frequency component of layer k to reflect texture of the foreground image. This optimization process is performed so as to solve the optimization problem of minimizing an error of a high-frequency component.

An error function $E_{i,j}$ in a pixel value $I_{i,j}$ of a certain pixel is a function of subtracting the target high-frequency component $H_{dst\_i,j}$ of the pixel from the high-frequency component of the pixel value $I_{i,j}$ in the pre-synthesis image $Op^k$ and squaring a result of subtraction as shown in Equation (4). As in the process of the frequency component calculation unit 13, the high-frequency component $H_{i,j}$ of the pixel value $I_{i,j}$ of a certain pixel is calculated by subtracting the low-frequency component $L_{i,j}$ of the pixel from the pixel value $k_{i,j}$ of the pixel. For example, the low-frequency component $L_{i,j}$ is calculated by calculating an average of pixel values of 3×3 pixels including the pixel and the surrounding 8 pixels. Also, in Equations (4) to (6), a reference sign indicating the layer is omitted. Also, in Equations (4) to (6), k is not a parameter indicating the layer and is used as a parameter indicating a column number of a pixel of an image or the like.

$$E_{i,j} = \left\{ \left( I_{i,j} - \frac{1}{9}\sum_{k=-1}^{1}\sum_{l=-1}^{1} I_{i+k,j+l} \right) - H_{dst\_i,j} \right\}^2 \quad (4)$$

As shown in Equation (5), an objective function E(I) is obtained by calculating a sum of error functions $E_{i,j}$ in the entire image (across all pixels). Also, a coefficient 81/2 is a value set for convenience of calculation, and may be another value because the coefficient does not affect the result of optimization.

$$E(I) = \frac{81}{2}\sum_{i,j} E_{i,j} = \frac{1}{2}\sum_{i,j} \begin{pmatrix} -I_{i-1,j-1} & -I_{i,j-1} & -I_{i+1,j-1} \\ 8I_{i,j} - I_{i-1,j} & & -I_{i+1,j} - 9H_{dst\_i,j} \\ -I_{i-1,j+1} & -I_{i,j+1} & -I_{i+1,j+1} \end{pmatrix}^2 \quad (5)$$

The image synthesis unit 18 optimizes the pixel value $I_{i,j}$ to minimize the objective function E(I). The image synthesis unit 18 optimizes the pixel value $I_{k,l}$, for example, using update Equation (6) in the pixel value $I_{k,l}$ obtained from a conditional expression of an extreme value. Also, κ denotes the number of optimizations.

$$I_{k,l}^{(\kappa+1)} = \quad (6)$$

$$\frac{1}{72}\begin{pmatrix} -I_{k-2,l-2}^{(\kappa)} & -2I_{k-1,l-2}^{(\kappa)} & -3I_{k,l-2}^{(\kappa)} & -2I_{k+1,l-2}^{(\kappa)} & -I_{k+2,l-2}^{(\kappa)} \\ -2I_{k-2,l-1}^{(\kappa)} & +14I_{k-1,l-1}^{(\kappa)} & +12I_{k,l-1}^{(\kappa)} & +14I_{k+1,l-1}^{(\kappa)} & -2I_{k+2,l-1}^{(\kappa)} \\ -3I_{k-2,l}^{(\kappa)} & +12I_{k-1,l}^{(\kappa)} & & +12I_{k+1,l}^{(\kappa)} & -3I_{k+2,l}^{(\kappa)} \\ -2I_{k-2,l+1}^{(\kappa)} & +14I_{k-1,l+1}^{(\kappa)} & +12I_{k,l+1}^{(\kappa)} & +14I_{k+1,l+1}^{(\kappa)} & -2I_{k+2,l+1}^{(\kappa)} \\ -I_{k-2,l+2}^{(\kappa)} & -2I_{k-1,l+2}^{(\kappa)} & -3I_{k,l+2}^{(\kappa)} & -2I_{k+1,l+2}^{(\kappa)} & -I_{k+2,l+2}^{(\kappa)} \end{pmatrix} +$$

$$\frac{1}{8}\begin{pmatrix} -H_{dst\_k-1,l-1}^{(\kappa)} & -H_{dst\_k,l-1}^{(\kappa)} & -H_{dst\_k+1,l-1}^{(\kappa)} \\ -H_{dst\_k-1,l}^{(\kappa)} & +8H_{dst\_k,l}^{(\kappa)} & -H_{dst\_k+1,l}^{(\kappa)} \\ -H_{dst\_k-1,l+1}^{(\kappa)} & -H_{dst\_k,l+1}^{(\kappa)} & -H_{dst\_k+1,l+1}^{(\kappa)} \end{pmatrix}$$

The image synthesis unit 18 iteratively calculates Equation (6) by incrementing the number of optimizations κ by one until the pixel value of the synthesis target pixel Mfg converges. The number of iterations is, for example, about 100. The image synthesis unit 18 acquires an image having optimized pixel values as a composite image $O^k$ of layer k. An order of a pixel to be optimized is optional and optimization of a plurality of pixels may be parallelized.

The image synthesis unit 18 iterates the above-described pre-processing and optimization process until the composite image $O^0$ of layer 0 is obtained. The image synthesis unit 18 outputs the composite image $O^0$ to the output unit 19.

The output unit 19 has a function of outputting the composite image generated by the image synthesis unit 18. The output unit 19 causes the display unit 21 to display the composite image, for example, by outputting the composite image to the display unit 21. The display unit 21 displays the composite image. As the display unit 21, for example, a display apparatus is used.

Next, an operation of the image synthesis apparatus 1 will be described. FIG. 7 is a flowchart illustrating a series of processes of an image synthesis method to be performed by the image synthesis apparatus 1. The process illustrated in FIG. 7 is started by performing imaging using an imaging apparatus such as a camera when, for example, an application for image synthesis is executed in the portable terminal 2. In this case, the process illustrated in FIG. 7 is iteratively performed at every time imaging is performed.

Figure 8A:
FIG. 8A is a diagram illustrating an example of a background image.
Figure 8B:
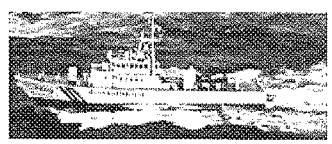
FIG. 8B is a diagram illustrating an example of a foreground image.

First, the image input unit 11 inputs a foreground image and a background image as synthesis targets (step S01, image acquisition step). For example, the image input unit 11 inputs a captured image as the foreground image and inputs an image previously prepared in the portable terminal 2 as the background image. The image input unit 11 inputs the image illustrated in FIG. 8A as the background image and inputs the image illustrated in FIG. 8B as the foreground image. Also, the image input unit 11 inputs synthesis information for synthesizing the foreground image with the background image. The image input unit 11 outputs the input foreground image and background image of layer 0 to the frequency component calculation unit 13, and outputs the input background image of layer 0 and synthesis information to the image synthesis unit 18.

Next, the frequency component calculation unit 13 calculates a low-frequency component and a high-frequency component from each of the foreground image and the background image of layer 0 which are a foreground image and a background image for an original image input by the image input unit 11 (step S02, frequency component calculation step). The frequency component calculation unit 13 outputs low-frequency components of the foreground image and the background image of layer 0 to the resolution reduction unit 12.

Next, the resolution reduction unit 12 generates a foreground image and a background image of layer 1 by sub-sampling low-frequency components of the foreground image and the background image of layer 0 to reduce the resolution (step S03, image acquisition step). The resolution reduction unit 12 outputs the foreground image and the background image of layer 1 to the frequency component calculation unit 13, and outputs the background image of layer 1 to the image synthesis unit 18. The frequency component calculation unit 13 determines whether the foreground image and the background image output from the resolution reduction unit 12 are a foreground image and a background image having the lowest resolution (step S04). Here, because the foreground image and the background image of layer 1 are output, it is determined that the foreground image and the background image output from the resolution reduction unit 12 are not a foreground image and a background image having the lowest resolution (step S04; No) in step S04 and steps S02 and S03 are iterated.

Figure 9:
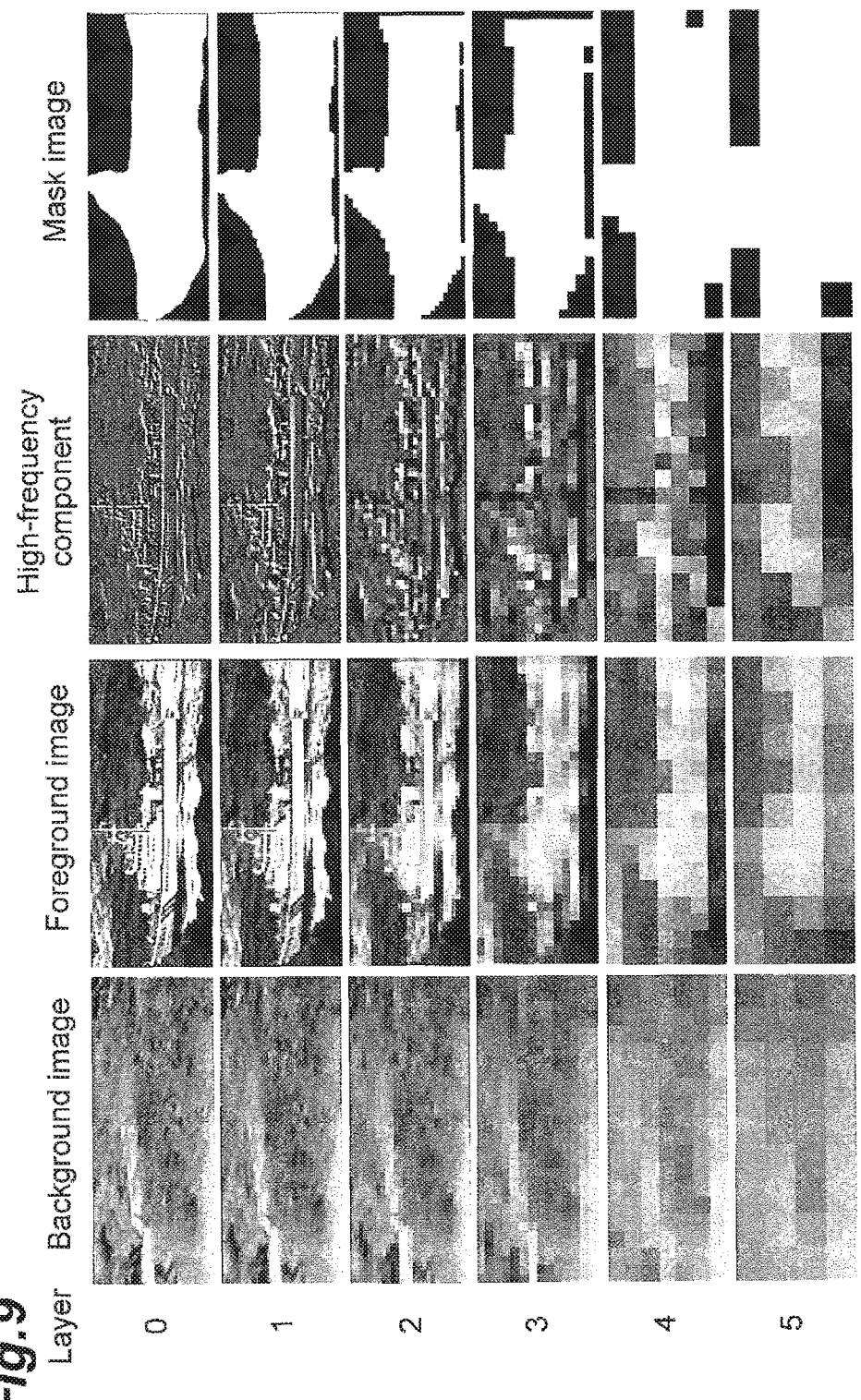
FIG. 9 is a diagram illustrating an example of a background image, a foreground image, a high-frequency component, and a mask image of each layer.

When the foreground image and the background image of layer N are output from the resolution reduction unit 12 by iterating steps S02 to S04, it is determined that the foreground image and the background image output from the resolution reduction unit 12 are a foreground image and a background image having the lowest resolution (step S04; Yes) in step S04, and the frequency component calculation unit 13 outputs high-frequency components of foreground images and background images of layers 0 to N−1 to the target high-frequency component calculation unit 14. In processes in steps S02 to S04, as illustrated in FIG. 9, the background images of layers 0 to N−1, the foreground images of layers 0 to N−1 and the high-frequency components of the foreground images of layers 0 to N−1 are generated and output to the target high-frequency component calculation unit 14, and the background images of layers 0 to N are output to the image synthesis unit 18. Also, in this example, N=6 and the illustration for the background image of layer 6 is omitted.

Next, the target high-frequency component calculation unit 14 calculates a target high-frequency component of each layer on the basis of a high-frequency component of the foreground image of each layer (step S05). As a method of calculating the target high-frequency component, for example, the methods shown in Equations (1) to (3) may be adopted. Here, a process of calculating the target high-frequency component using Equation (1) will be described. The target high-frequency component calculation unit 14 outputs calculated target high-frequency components of layers 0 to N−1 to the image synthesis unit 18.

Figure 8C:
FIG. 8C is a diagram illustrating an example of a mask image.

Next, the mask image input unit 16 inputs a mask image (step S06). For example, the mask image input unit 16 inputs an image illustrated in FIG. 8C as the mask image. The mask image reduction unit 17 reduces the mask image of layer 0 for an original image input by the mask image input unit 16 and generates the mask image of layer 1 (step S07). For example, the mask image reduction unit 17 divides the mask image of layer 0 into blocks each having 2×2 pixels, designates a block as one synthesis target pixel when at least one pixel included in the block is the synthesis target pixel, and designates a block as one non-synthesis target pixel when all pixels included in the block are non-synthesis target pixels, thereby generating a mask image of layer 1. The mask image reduction unit 17 iterates this process until a mask image of layer N−1 is obtained. In the process in step S07, mask images of layers (layers 1 to N−1) illustrated in FIG. 9 are generated. The mask image reduction unit 17 outputs mask images of layers 0 to N−1 to the image synthesis unit 18.

Next, the image synthesis unit 18 generates a composite image of each layer (step S08, image synthesis step). In step S08, first, the image synthesis unit 18 designates the background image of layer N as a composite image of layer N without change to conform the luminance and hue as a whole to those of the background image. The image synthesis unit 18 generates a composite image of layer N−1 by performing pre-processing and an optimization process on a composite image of layer N. In the pre-processing, the image synthesis unit 18 enlarges the composite image of layer N to be doubled and applies the mask image of layer N−1 to a predetermined position of the enlarged composite image of layer N. In the enlarged composite image of layer N, the image synthesis unit 18 replaces a pixel value of a pixel corresponding to a non-synthesis target pixel of the mask image of layer N−1 with a pixel value of a pixel of the background image of layer N−1 corresponding to the pixel. Also, in the enlarged composite image of layer N, the image synthesis unit 18 replaces a pixel value of a pixel corresponding to a pixel outside of a range of the mask image of layer N−1 with a pixel value of a pixel of a background image of layer N−1 corresponding to the pixel. Thus, the pre-synthesis image of layer N−1 is generated.

Next, in the optimization process, the image synthesis unit 18 performs an optimization process on a pixel corresponding to the synthesis target pixel of the mask image of layer N−1 using the target high-frequency component of layer N−1 in the pre-synthesis image of layer N−1 to reflect texture of the foreground image. This optimization process is performed by iteratively calculating Equation (6) until a pixel value of a pixel corresponding to the synthesis target pixel of the mask image of layer N−1 converges. The image synthesis unit 18 acquires an image having optimized pixel values as a composite image of layer N−1.

Figure 10:
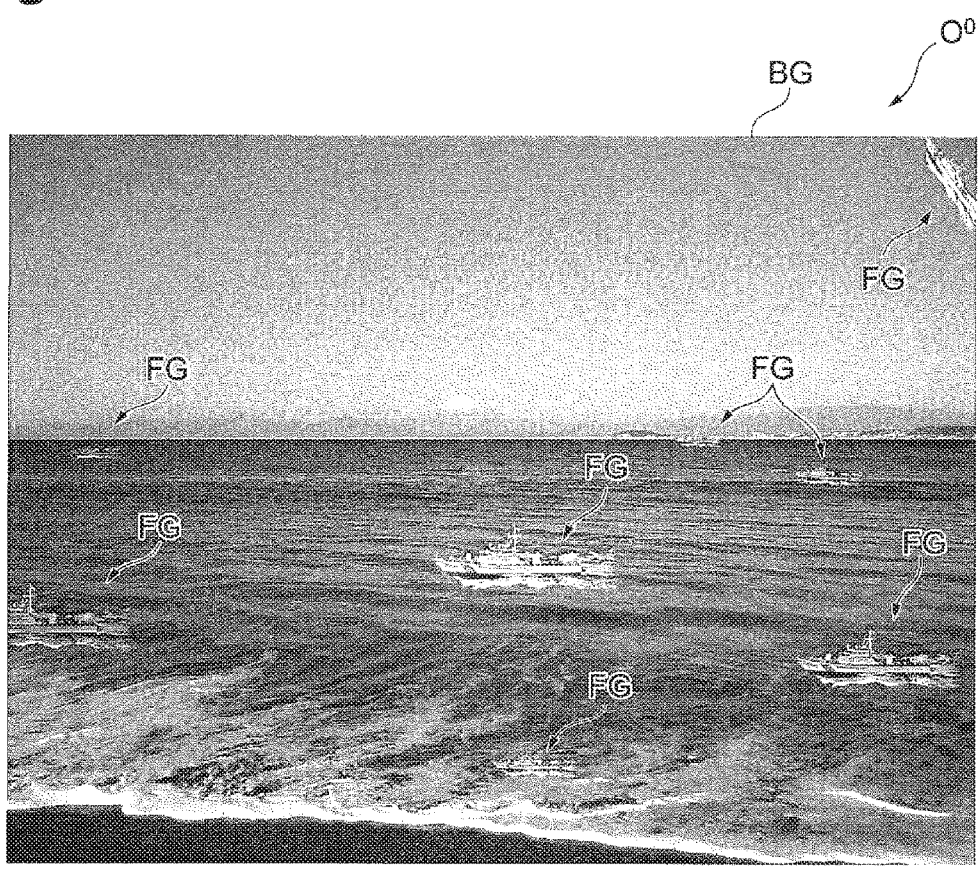
FIG. 10 is a diagram illustrating an example of a composite image.

The image synthesis unit 18 determines whether the composite image having the highest resolution (layer 0) is acquired (step S09). Here, because the composite image of layer N−1 is acquired, it is determined that the composite image is not a composite image having the highest resolution (step S09; No) in step S09 and step S08 is iterated. That is, the image synthesis unit 18 iteratively performs the above-described pre-processing and optimization process until the composite image of layer 0 is acquired. Steps S08 and S09 are iterated, so that a composite image $O^0$ of layer 0 illustrated in FIG. 10 is generated. As illustrated in FIG. 10, a boundary between the foreground image FG and the background image BG is unnoticeable and the composite image $O^0$ is generated with less discordance. When the composite image of layer 0 is generated and acquired, it is determined that the composite image is a composite image having the highest resolution (step S09; Yes) in step S09 and the image synthesis unit 18 outputs the composite image of layer 0 to the output unit 19.

Next, the output unit 19 outputs the composite image generated by the image synthesis unit 18 (step S10). For example, the output unit 19 causes the display unit 21 to display the composite image by outputting the composite image to the display unit 21. Thus, the series of processes of the image synthesis method are completed. Also, the processes of steps S01 to S05 and the processes of steps S06 and S07 may be performed in parallel.

Next, an image synthesis program for causing the portable terminal (computer) 2 to function as the above-described image synthesis apparatus 1 will be described.

The image synthesis program includes a main module, an input module, a calculation processing module, and an output module. The main module is a part for generally controlling image processing. The input module operates the portable terminal 2 to acquire an image and includes an image input module and a mask image input module. The calculation processing module includes a resolution reduction module, a frequency component calculation module, a target high-frequency component calculation module, a mask image reduction module, and an image synthesis module. The output module operates the portable terminal 2 to output the composite image. The functions to be implemented by executing the main module, the input module, the calculation processing module, and the output module are similar to those of the image acquisition unit 10, the frequency component calculation unit 13, the target high-frequency component calculation unit 14, the mask image acquisition unit 15, the image synthesis unit 18, and the output unit 19 of the above-described image synthesis apparatus 1.

The image synthesis program is provided on, for example, a recording medium such as a ROM, a semiconductor memory. Also, the image synthesis program may be provided via a network as a data signal.

According to the image synthesis apparatus 1, the image synthesis method, the image synthesis program, and the recording medium recording the image synthesis program according to the present embodiment, the composite image is generated on the basis of the low-frequency components of the background images corresponding to the plurality of resolutions and the high-frequency components of the foreground images corresponding to the plurality of resolutions. The luminance and hue as a whole are included in the low-frequency component and texture is included in the high-frequency component. Thus, it is possible to reflect texture (detailed pattern) of the foreground image while the luminance and hue of the composite image are conformed to the luminance and hue of the background image. Also, because the composite image is generated by synthesizing various frequency components, there is theoretically no pixel value distortion caused by mathematical constraints as in Poisson blending. As a result, it is possible to generate a composite image with an unnoticeable boundary between two images which are synthesized while the pixel value distortion due to mathematical constraints is suppressed.

In Poisson blending, an offset of the background image is held by performing optimization under a Dirichlet condition (fixed end condition) using a gradient. However, in Poisson blending, calculation amount for estimating an image having a gradient closest to an objective gradient may increase. Thus, it may be impossible to perform the synthesis process at high speed. On the other hand, because the image synthesis apparatus 1 synthesizes the high-frequency component of the foreground image in ascending order of resolutions, it is possible to shorten a calculation time necessary for the optimization.

Also, because the non-synthesis target region of the enlarged composite image of layer k−1 is replaced with a region corresponding to a non-synthesis target region in a background image of layer k, a background image of layer k is reproduced as it is in the non-synthesis target region in the composite image of layer k. In the pre-synthesis image in which the background image of layer k is reproduced in the non-synthesis target region, the target high-frequency component of layer k is synthesized in the synthesis target region so that a difference between the high-frequency component of the synthesis target region and the target high-frequency component is minimized. Thus, a change in a boundary between the synthesis target region and the non-synthesis target region is reduced and texture of the foreground image of layer k is reproduced without changing the luminance and hue as a whole in the synthesis target region in the composite image of layer k. As a result, it is possible to make the boundary between the two images which are to be synthesized less noticeable and generate the composite image with less discordance.

Also, a foreground image and a background image of layer k+1 are generated by shrinking the low-frequency component of the foreground image of layer k and the low-frequency component of the background image of layer k. Thus, it is possible to facilitate resolution reduction of the foreground image and the background image. Also, the luminance and hue as a whole of the background image are included in a lowest-frequency component of the background image. Thus, it is possible to conform the luminance and hue as a whole to those of the background image by using the lowest-frequency component of the background image as a composite image of the lowest resolution (layer N).

Also, the composite image of each layer is generated using the mask image of each layer. Thus, it is possible to define the synthesis target region and the non-synthesis target region of each layer by decreasing the resolution of the mask image. Thus, it is possible to easily define the synthesis target region and the non-synthesis target region in each layer.

Also, the mask image of layer k is divided into blocks each having a predetermined number of pixels, and a mask image of layer k+1 is generated by designating a block as a synthesis target pixel when the synthesis target pixel is included in the block and designating a block as a non-synthesis target pixel when no synthesis target pixel is included in the block. Thereby, a region occupied by the synthesis target pixel in the mask image can be expanded as the resolution of the mask image decreases. Thus, in the image synthesis, a target high-frequency component of a layer greater than layer k is synthesized in the synthesis target region in layer k and a target high-frequency component of a layer greater than layer k is also synthesized at the periphery of a boundary between the synthesis target region and the non-synthesis target region. Therefore, it is possible to improve the reproducibility of the foreground image, make the boundary between the two images which are synthesized less noticeable, and generate the composite image with less discordance.

For each layer, the high-frequency component of the foreground image is calculated by subtracting the low-frequency component from the foreground image, and the high-frequency component of the background image is calculated by subtracting the low-frequency component from the background image. Thus, it is possible to calculate the high-frequency component of the foreground image of each layer and the high-frequency component of the background image of each layer through simple calculation.

Also, the above-described embodiment shows an example of an image synthesis apparatus according to the present invention. The image synthesis apparatus according to the present invention is not limited to the image synthesis apparatus 1 according to the embodiment and the image synthesis apparatus according to the embodiment may be modified or applied to others in a range in which the scope and spirit described in each claim do not change.

For example, the mask image input unit 16 may input a mask image generated by the user.

Also, the output unit 19 may output e composite image to a storage apparatus such as a memory.

What is claimed is:

1. An image synthesis apparatus for generating a composite image by synthesizing a second image with a part of a first image, the image synthesis apparatus comprising:
   an image acquisition unit configured to acquire first group images including the first image and a plurality of different resolution images corresponding to the first image, and second group images including the second image and a plurality of different resolution images corresponding to the second image;
   a frequency component calculation unit configured to calculate low-frequency components and high-frequency components from the first group images and the second group images; and
   an image synthesis unit configured to generate the composite image on the basis of the low-frequency components of the first group images and the high-frequency components of the second group images.

2. The image synthesis apparatus according to claim 1, wherein the image acquisition unit shrinks the low-frequency component of one of the first group images having a first resolution and the low-frequency component of one of the second group images having the first resolution, thereby generating one of the first group images having a second resolution less than the first resolution and one of the second group images having the second resolution.

3. The image synthesis apparatus according to claim 2,
   wherein the image synthesis unit generates a temporary composite image for each resolution, and
   wherein, after enlarging the generated temporary composite image having the second resolution and replacing a non-synthesis target region which is not a region of a synthesis target of the enlarged temporary composite image having the second resolution with a region corresponding to the non-synthesis target region in the first image having the first resolution, the image synthesis unit generates the temporary composite image having the first resolution by synthesizing a target high-frequency component in the synthesis target region so that a difference between a high-frequency component of the synthesis target region which is the region of the synthesis target of the enlarged temporary composite image having the second resolution and the target high-frequency component determined on the basis of a high-frequency component of the one of the second group images having the first resolution is minimized.

4. The image synthesis apparatus according to claim 3, wherein the image synthesis unit sets one of the first group images having the lowest resolution among the first group images as the temporary composite image having the lowest resolution.

5. The image synthesis apparatus according to claim 4, further comprising:
   a mask image acquisition unit configured to acquire mask group images corresponding to the plurality of resolutions of the first group images, for defining the synthesis target region and the non-synthesis target region,
   wherein the image synthesis unit uses each of the mask group images for each resolution to generate the temporary composite image for each resolution.

6. The image synthesis apparatus according to claim 5, wherein the mask image acquisition unit divides one of the mask group images having the first resolution into blocks each having a predetermined number of pixels and generates one of the mask group images having the second resolution by replacing a block including the synthesis target region with a pixel of the synthesis target region and replacing a block not including the synthesis target region with a pixel of the non-synthesis target region.

7. The image synthesis apparatus according to claim 6,
   wherein, for each resolution, the high-frequency component calculation unit calculates the high-frequency component of the first group images by subtracting the low-frequency component of the first group images from the first group images and calculates the high-frequency component of the second group images by subtracting the low-frequency component of the second group images from the second group images.

8. The image synthesis apparatus according to claim 4,
   wherein, for each resolution, the high-frequency component calculation unit calculates the high-frequency component of the first group images by subtracting the low-frequency component of the first group images from the first group images and calculates the high-frequency component of the second group images by subtracting the low-frequency component of the second group images from the second group images.

9. The image synthesis apparatus according to claim 5,
   wherein, for each resolution, the high-frequency component calculation unit calculates the high-frequency component of the first group images by subtracting the low-frequency component of the first group images from the first group images and calculates the high-frequency component of the second group images by subtracting the low-frequency component of the second group images from the second group images.

10. The image synthesis apparatus according to claim 3, further comprising:
    a mask image acquisition unit configured to acquire mask group images corresponding to the plurality of resolutions of the first group images, for defining the synthesis target region and the non-synthesis target region, wherein the image synthesis unit uses each of the mask group images for each resolution to generate the temporary composite image for each resolution.

11. The image synthesis apparatus according to claim 10, wherein the mask image acquisition unit divides one of the mask group images having the first resolution into blocks each having a predetermined number of pixels and generates one of the mask group images having the second resolution by replacing a block including the synthesis target region with a pixel of the synthesis target region and replacing a block not including the synthesis target region with a pixel of the non-synthesis target region.

12. The image synthesis apparatus according to claim 11, wherein, for each resolution, the high-frequency component calculation unit calculates the high-frequency component of the first group images by subtracting the low-frequency component of the first group images from the first group images and calculates the high-frequency component of the second group images by subtracting the low-frequency component of the second group images from the second group images.

13. The image synthesis apparatus according to claim 10, wherein, for each resolution, the high-frequency component calculation unit calculates the high-frequency component of the first group images by subtracting the low-frequency component of the first group images from the first group images and calculates the high-frequency component of the second group images by subtracting the low-frequency component of the second group images from the second group images.

14. The image synthesis apparatus according to claim 3, wherein, for each resolution, the high-frequency component calculation unit calculates the high-frequency component of the first group images by subtracting the low-frequency component of the first group images from the first group images and calculates the high-frequency component of the second group images by subtracting the low-frequency component of the second group images from the second group images.

15. The image synthesis apparatus according to claim 2, wherein, for each resolution, the high-frequency component calculation unit calculates the high-frequency component of the first group images by subtracting the low-frequency component of the first group images from the first group images and calculates the high-frequency component of the second group images by subtracting the low-frequency component of the second group images from the second group images.

16. The image synthesis apparatus according to claim 1, wherein, for each resolution, the high-frequency component calculation unit calculates the high-frequency component of the first group images by subtracting the low-frequency component of the first group images from the first group images and calculates the high-frequency component of the second group images by subtracting the low-frequency component of the second group images from the second group images.

17. An image synthesis method to be performed by an image synthesis apparatus for generating a composite image by synthesizing a second image with a part of a first image, the image synthesis method comprising:
   an image acquisition step of acquiring first group images including the first image and a plurality of different resolution images corresponding to the first image, and second group images including the second image and a plurality of different resolution images corresponding to the second image;
   a frequency component calculation step of calculating low-frequency components and high-frequency components from the first group images and the second group images; and
   an image synthesis step of generating the composite image on the basis of the low-frequency components of the first group images and the high-frequency components of the second group images.

18. A non-transitory recording medium recording an image synthesis program for operating a computer to generate a composite image by synthesizing a second image with a part of a first image, the image synthesis program for causing the computer to function as:
   an image acquisition unit configured to acquire first group images including the first image and a plurality of different resolution images corresponding to the first image, and second group images including the second image and a plurality of different resolution images corresponding to the second image;
   a frequency component calculation unit configured to calculate low-frequency components and high-frequency components from the first group images and the second group images; and
   an image synthesis unit configured to generate the composite image on the basis of the low-frequency components of the first group images and the high-frequency components of the second group images.

* * * * *